Aug. 3, 1937. J. B. WHITTED 2,088,826
WINDSHIELD CLEANER
Filed Oct. 29, 1934 5 Sheets-Sheet 1
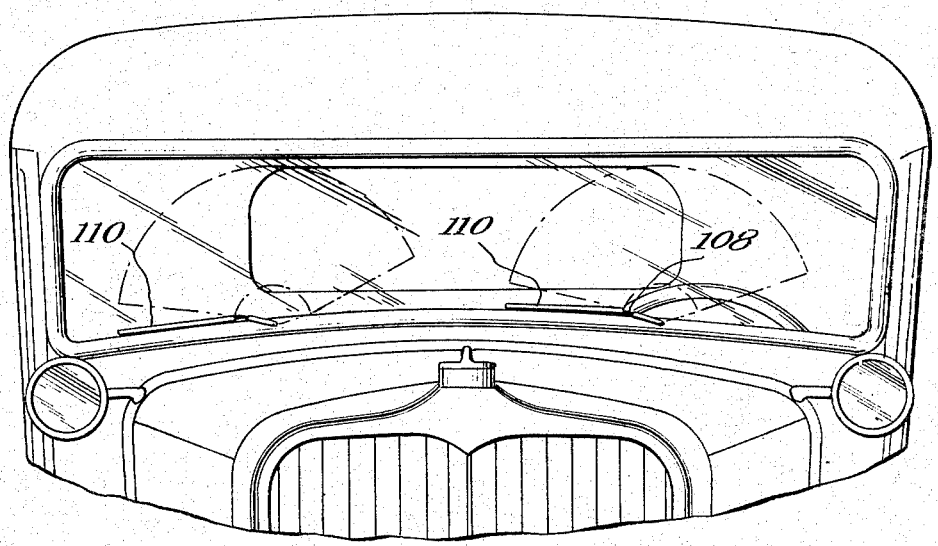
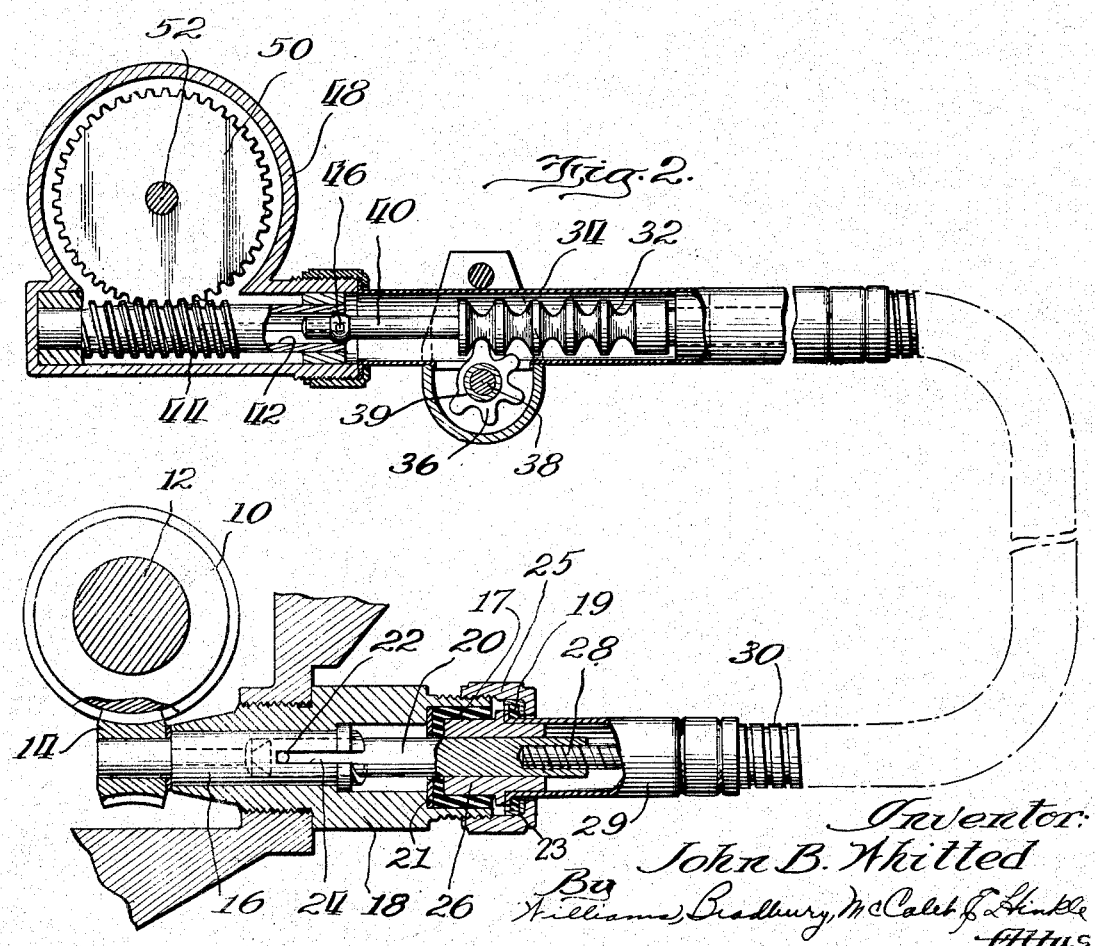
Inventor:
John B. Whitted
By Williams, Bradbury, McCaleb & Hinkle
Attys Aug. 3, 1937.                J. B. WHITTED                2,088,826
                          WINDSHIELD CLEANER
                       Filed Oct. 29, 1934            5 Sheets-Sheet 2
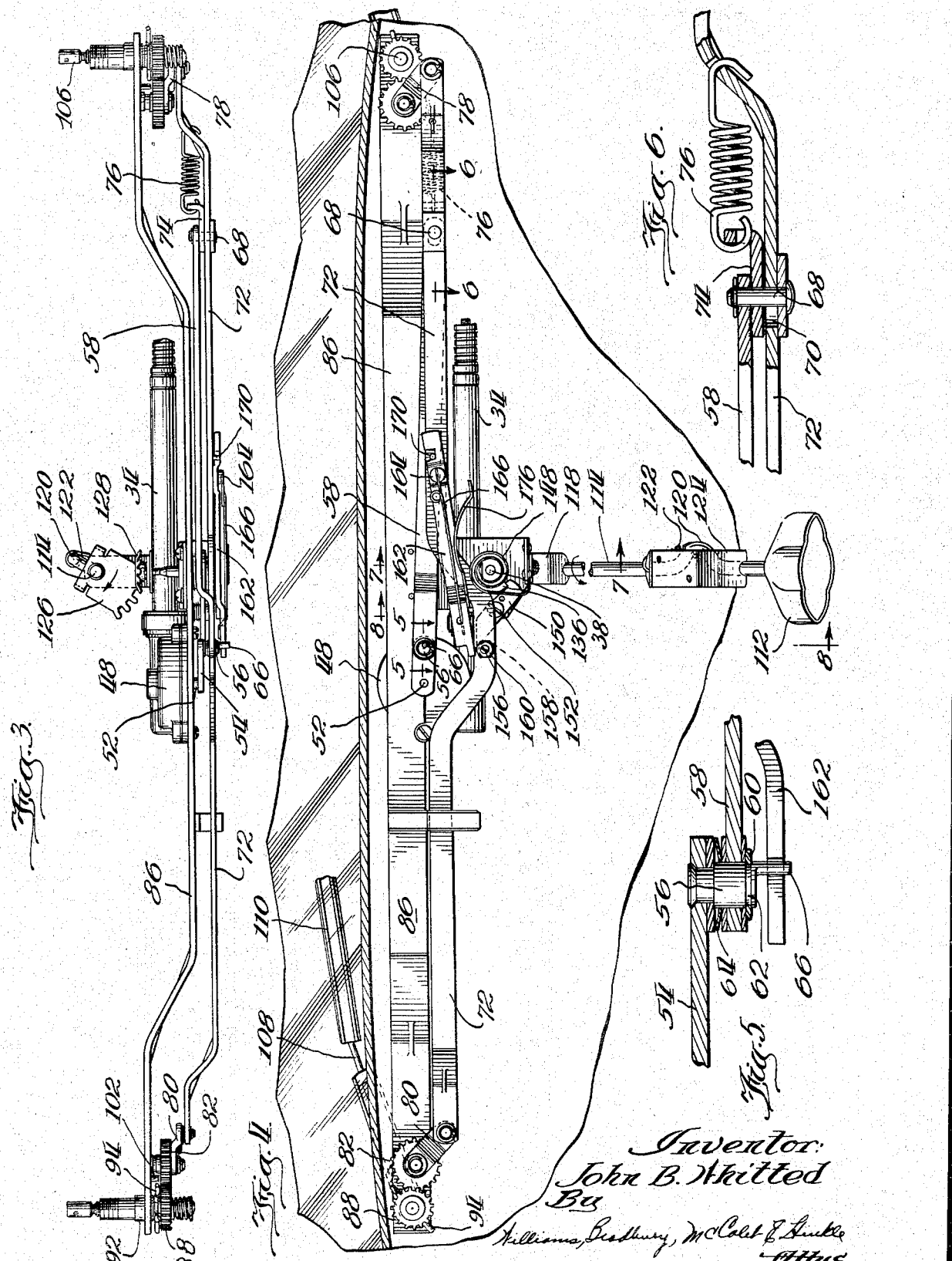
Inventor:
John B. Whitted
By
Williams, Bradbury, McCaleb & Hinkle
Attys.

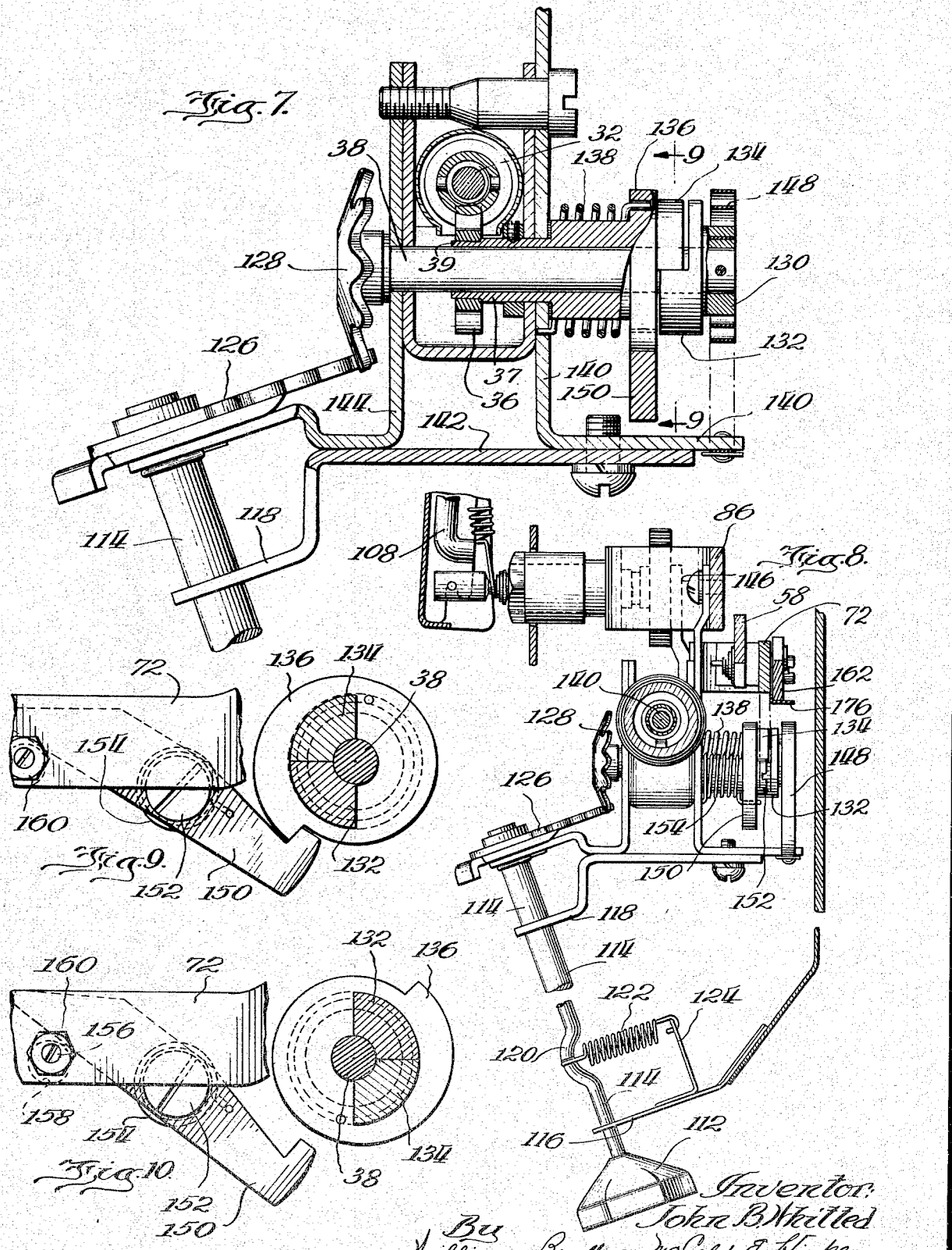

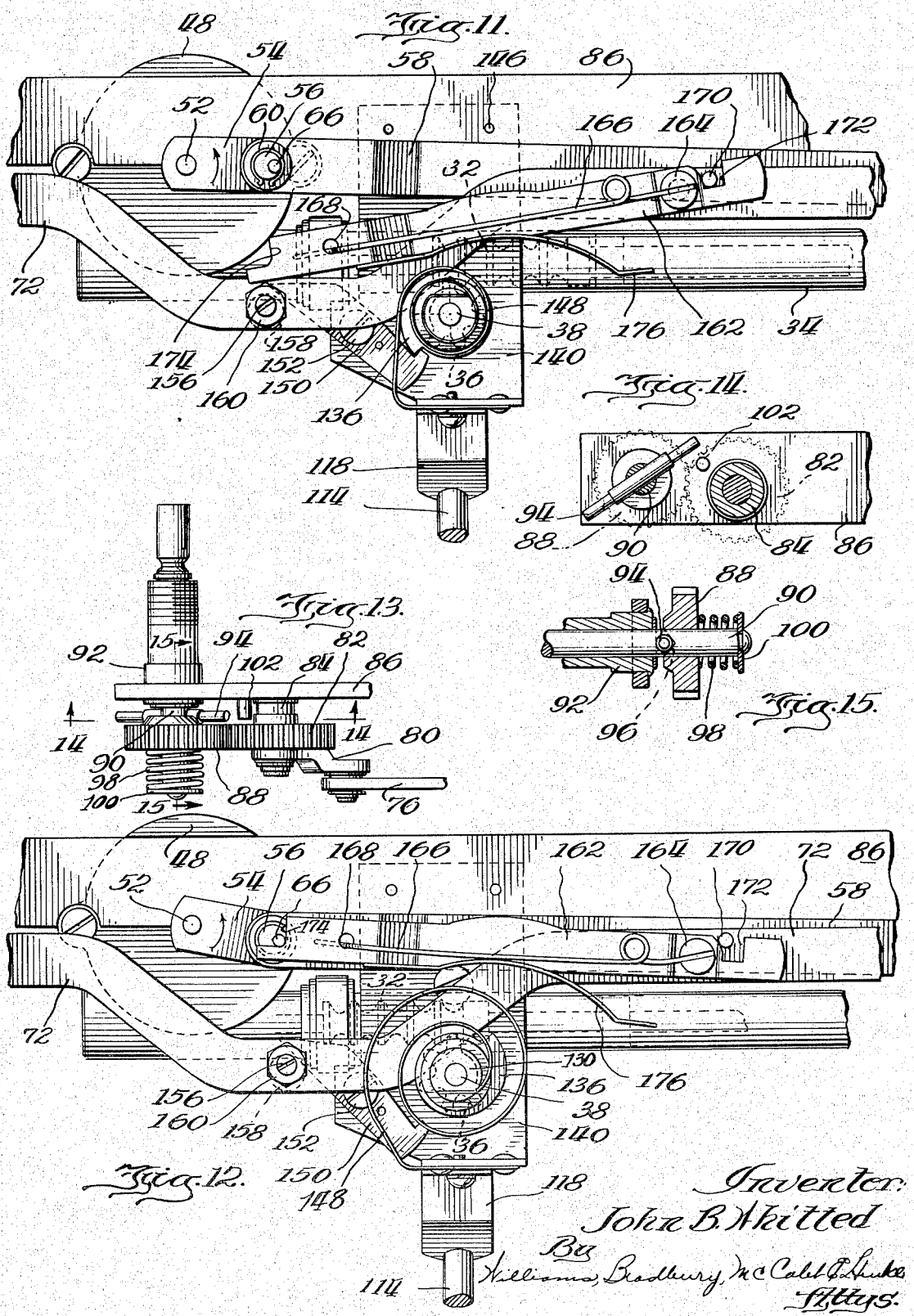

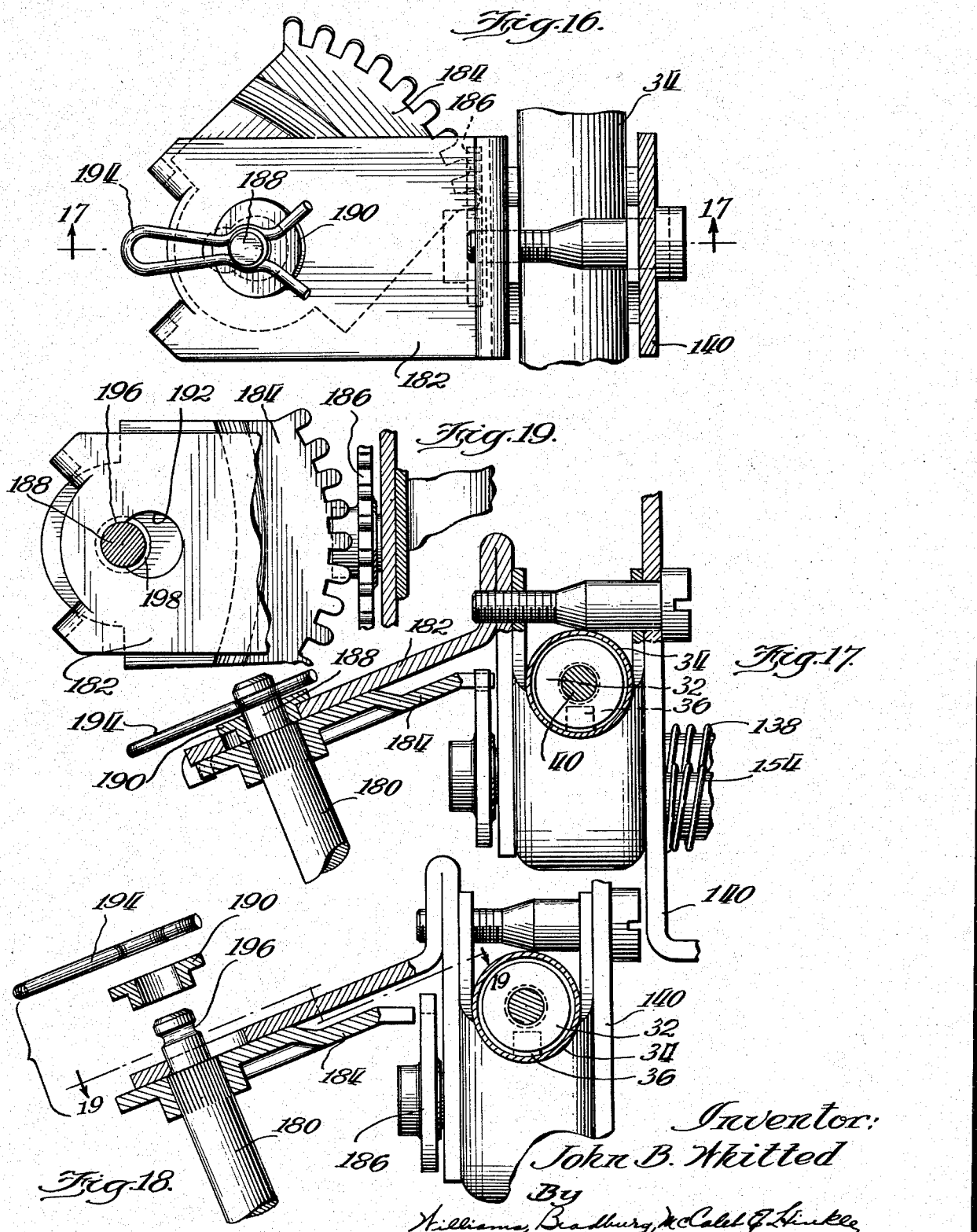

Patented Aug. 3, 1937

2,088,826

UNITED STATES PATENT OFFICE 2,088,826

WINDSHIELD CLEANER

John B. Whitted, Evanston, Ill., assignor to Stewart-Warner Corporation, Chicago, Ill., a corporation of Virginia Application October 29, 1934, Serial No. 750,472

2 Claims. (Cl. 15—255)

My invention relates generally to windshield cleaners, and more particularly to improvements in operating and control mechanism for mechanically driven windshield wipers.

In windshield wipers for automotive vehicles which are mechanically driven from a rotating part of the engine, difficulty has been encountered in providing a simple and reliable means for controlling the operation of the wipers. The control mechanism should preferably include means for causing the wipers to be moved to a "parked" position somewhat beyond their normal oscillating range and have means for disengaging the mechanical drive at the instant that the wipers reach the "parked" position. These objects are attained in the construction disclosed herein.

A further object of my invention is to provide an improved slip drive connection between the wiper operating mechanism and the wiper rock shaft whereby the wiper may be arrested during normal operation of the cleaner without damaging the operating mechanism, and whereby upon release of the wiper, a driving connection between the wiper rock shaft and its operating mechanism will be reestablished with the parts in proper phase relationship.

A further object is to provide means for preventing the transmission of engine vibration and noise through the casing of the flexible drive shaft.

A further object is to provide an improved means for disengaging the drive shaft clutch.

A further object is to provide an improved means for moving the wipers beyond their normal operating range to their "parked" positions.

A further object is to provide an improved control mechanism in which the control handle may be located a considerable distance from the operating mechanism.

Other objects will appear from the following description, reference being had to the accompanying drawings, in which:

Fig. 1 is a front elevation of a portion of an automobile showing the windshield wipers in "parked" position and illustrating the range of their operation;

Fig. 2 is a sectional view showing the flexible driving shaft and clutch mechanism;

Fig. 3 is a plan view of the wiper operating and control mechanism;

Fig. 4 is an elevation of the windshield wiper driving and controlling mechanism;

Fig. 5 is a fragmentary sectional view showing the mounting of the crank pin, taken on the line 5—5 of Fig. 4;

Fig. 6 is a fragmentary sectional view taken on the line 6—6 of Fig. 4, and showing the lost motion driving connection between the connecting rod and driving link;

Fig. 7 is a vertical sectional view taken on the line 7—7 of Fig. 4;

Fig. 8 is a vertical sectional view taken on the line 8—8 of Fig. 4;

Fig. 9 is a fragmentary sectional view taken on the line 9—9 of Fig. 7 and showing the parts in the position assumed while the wiper is operating;

Fig. 10 is a view similar to Fig. 9 showing the parts in the position assumed when the wiper is not in operation;

Fig. 11 is a fragmentary elevation of the operating mechanism shown in operating position;

Fig. 12 is a view similar to Fig. 11 showing the parts in the position assumed when the wiper is not in operation;

Fig. 13 is a plan view of the driving connection between the operating means and the wiper rock shaft;

Fig. 14 is a fragmentary sectional view taken on the line 14—14 of Fig. 13;

Fig. 15 is a fragmentary sectional view taken on the line 15—15 of Fig. 13;

Fig. 16 is a plan view of a modified form of control mechanism;

Fig. 17 is a vertical sectional view thereof taken on the line 17—17 of Fig. 16;

Fig. 18 is a view similar to Fig. 17 illustrating the parts during the assembly operation; and Fig. 19 is a sectional view taken on the line 19—19 of Fig. 18.

The driving mechanism shown in Fig. 2 is disclosed in my co-pending application Serial No. 719,429 filed April 7, 1934, and comprises generally a worm 10 secured to a suitable rotating part of the automobile engine, such as the cam shaft 12, the worm meshing with a worm wheel 14 secured to a spindle 16 suitably journaled in a bearing member 18. The spindle 16 is bored to receive a clutch member 20 which has a pin 22 extending therethrough and projecting therefrom. The pin 22 is adapted to be engaged in a slot 24 formed in the spindle 16, the pin and slot thus forming a clutch mechanism. The clutch member 20 is mounted for rotation and longitudinal sliding movement in a bushing 26, and has a flexible shaft 28 secured thereto. The flexible shaft 28 extends through a flanged ferrule 29 secured to a flexible casing 30, and through the casing to a rack 32 which is positioned within a housing 34 located adjacent the windshield.

The bushing 26 is pressed into the ferrule 29, and the bushing and ferrule separated from the bearing member by insulating cup 17 and ring 19, the cup and ring being preferably made of an oil resisting rubber or rubber-like composition. The base of the cup 17 is supported by a flat washer 21 and the ring 19 is carried in a flanged washer 23 and the assembly clamped in place by a sleeve nut 25. The cup 17 and ring 19 thus completely insulate the ferrule 29 from the bearing member 18 and prevent transmission of engine noise and vibration to the casing 30 when the clutch member 20 is disengaged from the spindle 16, and will greatly reduce the noise even when the clutch is engaged. The provision of this vibration and noise insulation is of considerable practical importance because a windshield cleaner mechanism which is noisy even when not in operation would not be accepted by the public. The rack 32 is engaged by a mutilated pinion 36 secured to a sleeve 37 rotatable on a control shaft 38. The rack is provided with an extension 40 which is longitudinally slidable into the bore 42 of a worm 44.

Pins 46 projecting from the extension 40 of the rack are engageable in suitable key slots formed within the bore 42, and thus form a rotating driving connection between the extension 40 and the worm. The worm 44 is suitably mounted for rotation in a housing 48 and drives a worm wheel 50 which is secured to a shaft 52 which is suitably journaled in the housing 48.

Referring to Figs. 3, 4, 5, and 11, the shaft 52 projects from the housing 48 and has a crank 54 secured thereto. A shouldered crank pin 56 is riveted to the crank 54 and has a connecting link 58 pivotally connected thereto. The link 58 is secured to the pin 56 by a split ring 60 (Fig. 5) which fits in a groove 62 formed in the crank pin 56. A dished resilient washer 64 is interposed between the crank 54 and the connecting link 58 to take up play and wear. The crank pin 56 has an eccentric overthrow pin-like projection 66 formed integrally therewith, this projection being eccentrically positioned to enable it to be accurately located by rotation of the pin 56 during the assembly of the mechanism.

The connecting link 58 carries a pin 68 which projects through an elongated slot 70 formed in an actuating link 72. A clip 74 is interposed between the connecting link 58 and the actuating link 72 and has an apertured sidewardly extending lug forming an anchorage for one end of a tension coil spring 76, the other end of which is secured to the connecting link 72. The pin 68 and its associated parts thus forms a resilient lost motion driving connection between the connecting link 58 and the actuating link 72. The actuating link is pivotally secured at its ends to arms 78 and 80 respectively.

As best shown in Fig. 13, the arm 80 is secured to a gear 82 mounted for rotation upon a stud 84 which is riveted to a mounting plate 86. The gear 82 meshes with a pinion 88 which is rotatable upon a wiper rock shaft 90. The wiper rock shaft is suitably journaled in a sleeve 92 carried in the mounting plate 86 and has a pin 94 projecting diametrically therethrough. The pinion 88 has a pair of V-shaped notches 96 formed in the hub thereof for engagement with the projecting ends of the pin 94, the pinion being resiliently held in such engagement with the pin 94 by a coil spring 98 compressed between the pinion 88 and a washer 100 riveted to the end of the rock shaft 90. This driving connection between the pinion 88 and the rock shaft forms a slip drive to prevent breakage or derangement of the operating mechanism should the windshield wiper arms be arrested while the cleaner is in operation. Upon such occurrence the pinion 88 will be pressed outwardly by the pin 94 to disengage the notches 96 from the pin.

When the pinion 88 has been thus forced out of proper engagement with the pin 94 the wiper arm when released might be oscillated improperly due to the frictional engagement of the ends of the pin 94 with the flat surface of the hub of the pinion 88. To prevent such improper operation a stop comprising a pin 102 is pressed into the mounting plate 86. If the wiper is being oscillated when the notches in the hub of the pinion 88 are not properly in engagement with the pin 94, one or the other of the ends of the pin 94 will strike the stop pin 102 and hold the latter until the notches 96 in the hub of the pinion 88 re-engage the pin 94. This slip drive connection constitutes an improvement upon the connection disclosed in my aforesaid copending application Serial No. 692,588.

The right hand wiper is provided with gears and pinions for operating its rock shaft 106 of substantially identical construction with that shown in Fig. 13 and will not be described in detail. Each of the rock shafts 90 and 106 is provided at its outer extremity with a suitable connection to a wiper arm 108 (Figs. 4 and 8) to which a squeegee 110 is suitably secured. As shown in Fig. 1, the wipers are arranged to operate in parallelism through the angle indicated by the dotted lines in Fig. 1, and are adapted upon being stopped to be moved to the "parked" position shown in Fig. 1 where they rest closely adjacent the frame of the windshield in inconspicuous position, and where they do not interfere with the view of the operator of the vehicle.

The means for controlling the operation of the windshield comprises generally a handle 112 secured to a shaft 114 which is suitably mounted for rotation in brackets 116 and 118. The shaft 114 has an arcuate bend 120 formed therein. A spring 122 is tensioned between the arcuate portion 120 of the shaft 114 and a suitable anchorage bracket 124. The spring thus tends to hold the shaft in "on" and "off" positions respectively, the shaft being rotated through dead center position with respect to the spring 122 when turned from "on" to "off" position and vice versa. A stamped gear sector 126 is rigidly secured to the upper end of the control shaft 114 and engages a pinion 128 secured to the end of shaft 38. A collar 130 is secured to the right hand (Fig. 7) end of shaft 38, the collar being provided with a quadrant-shaped projection 132 which is adapted to engage a similarly shaped projection 134 formed on the sleeve 37. The sleeve 37 has a single toothed cam shaped member 136 formed integrally therewith. A torsion spring 138 has one end anchored to the sleeve 37 and its other end secured to a supporting member 140, which latter, together with a plate 142 and frame member 144, form a supporting frame for the control mechanism, this frame being secured to the mounting plate 86 by screws 146, as shown in Fig. 8.

A coil 148 of strip spring metal has its inner end secured to the collar 130 and its outer end anchored to the frame member 140 as shown in Fig. 7.

A latch 150 is mounted for pivotal movement on a stud 152 threaded in the frame member 140 and is normally held in engagement with the peripheral edge of the toothed member 136 by a torsion coil spring 154 surrounding the stud 152 (Fig. 8). A screw 156 having an eccentric head to permit easily adjusting its position is secured to the connecting link 72 by nut 160.

An overthrow arm 162 (Figs. 11 and 12) is pivotally secured to the actuating link 72 by a shouldered rivet 164 and is normally tensioned to move to its lower inoperative position shown in Fig. 11 by a wire spring 166, one end of which is anchored in the kerf of the rivet 164 and the other end of which projects through a hole 168 formed in the arm. Downward swinging movement of the arm is limited by a stop pin 170 which engages in a notch 172 formed in the arm 162. The free end of the arm 162 is provided with a notch forming a shoulder 174 for engagement with the projection 66 of the crank pin 56. An arcuate strip 176 is secured to the lower edge of the arm 162 or may be formed integrally therewith, and overlies the spring strip coil 148.

When the wiper is not in operation the parts will be in the positions in which they are shown in Figs. 10 and 12, in which position the rack 32 will be in its leftmost position and the pin 22 of the clutch member 20 withdrawn from the slot 24. When it is desired to render the windshield cleaner operative the handle 112 is rotated in the direction indicated by the arrows in Figs. 3 and 4, thus through the intermeshing segment 126 and pinion 128 rotating the shaft 38 clockwise (Fig. 11). The quadrant-shaped projection 132 formed on the collar 130 will, through the quadrant 134, rotate the toothed member 136 clockwise from the positions in which these parts are shown in Fig. 10 to the positions in which they are shown in Fig. 9.

Upon reaching the position shown in Fig. 9, the toothed member 136 will be engaged by the latch 150 and the former thus held in the position shown. It will be noted that clockwise rotation of the shaft 38 will more tightly wind the spring strip coil 148 as shown in Fig. 11. Clockwise rotation of the shaft 38 and the sleeve 37 will, through the mutilated pinion 36 and rack 32, force the pin 22 of the clutching member 20 into the slot 24 of the spindle 16, whereupon the flexible drive shaft will transmit rotary movement to the worm 44 and hence to the crank arm 54. In the construction shown the shaft 52 to which the crank arm 54 is attached will rotate counterclockwise. Upon rotation of the shaft 52 the crank arm 54 will reciprocate the actuating link 72 and thus through the gears and pinions 82, 88, oscillate the wiper rock shafts. The cleaner will continue operation and the squeegees of the wipers oscillate through the arcs indicated in dot-dash lines in Fig. 1.

When it is desired to stop the operation of the windshield cleaner, the handle 112 is rotated in a direction opposite to that indicated by the arrow in Figs. 3 and 4, thereby rotating the shaft 38 counterclockwise. Such counterclockwise movement of the shaft 38 will cause a partial unwinding of the spiral coil 148, causing its outer convolution to engage the strip 176 which is attached to the overthrow arm 162 and thereby raising the latter from the position in which it is shown in Fig. 11 to a position in which its shoulder 174 lies in the path of the projecting portion 66 of the crank pin 56. The crank arm 54 will continue rotating until the projection 66 of the crank pin 56 engages the shoulder, and through such engagement forces the arm 162 and hence the actuating link 72 to the right (Fig. 11) to the position shown in Fig. 12.

The lost motion connection shown in detail in Fig. 6 will permit this excess movement to the right of the connecting link 72 and the link will, through the gears 82 and pinions 88, swing the wiper arms to their "parked" positions as indicated in Fig. 1. Just prior to the time that the connecting link 72 reaches its extreme rightmost position, the eccentric head 158 of the screw 156 will engage the tail portion of the latch 150 and swing the latter clockwise to disengage its tooth from that of the toothed member 136. Upon disengagement of the latch the torsion spring 138 will rotate the sleeve 37 counterclockwise and through the mutilated pinion 36 and rack 32 withdraw the pin 22 from its slot 24, thus disconnecting the drive. The operating parts will thus come to rest substantially in the position as shown in Fig. 12. It will be noted that in this position the friction between the shoulder 174 of the arm 162 and the projection 66 of the crank pin 56 will be sufficiently great to prevent the spring 166 from swinging the arm 162 downwardly.

The modified form of manually operable control mechanism as shown in Figs. 16 to 19 inclusive possesses a number of advantages over that shown in Figs. 7 and 8, for installations on certain kinds of automobiles. The handle shaft 180, which corresponds to the handle shaft 114 shown in Figs. 7 and 8, is detachably secured to a supporting bracket 182 instead of being more or less permanently assembled with the frame of the windshield wiper operating mechanism. The mechanism as a whole is thus rendered less bulky for shipment and the installation of the wiper mechanism upon an automobile by the automobile manufacturer is simplified.

The shaft 180 has a segmental gear 184 pressed over the upper end thereof so as to be permanently secured thereto. The teeth of the segment 184 mesh with the teeth of a mutilated pinion 186. The upper end of the shaft 180 has a portion 188 of reduced diameter which is surrounded by a bearing bushing 190, the latter fitting in an enlarged circular portion 192 of an opening formed in the bracket 182. The shaft is held in position by a spring clip 194 which fits about a groove 196 formed in the reduced diameter portion 188 of the shaft.

To facilitate the assembly of the handle control shaft and gear 184 to the frame, the bracket 182 has a small diameter aperture 198 which partially intersects the larger opening 192. Due to the provision of the aperture 198 the shaft 180 may be positioned as shown in Fig. 18 and then moved to the right to bring the teeth of its segmental gear 184 into mesh with the teeth of the mutilated pinion 186. After the teeth of these two parts are intermeshed the bushing 190 is placed over the reduced diameter portion 188 of the shaft, the bushing fitting snugly within the enlarged portion 192 of the aperture. Thereafter the spring clip 194 is secured to the end of the shaft, thus holding the parts in the assembled position as shown in Figs. 16 and 17. The lower end of the control shaft 180 may be supported by a bracket 116, 124 as illustrated in Fig. 8.

The modified construction shown in Figs. 16 to 19 inclusive thus makes it possible to pack the windshield wiper more easily with less liability of damage during shipment and furthermore facilitates the installation of the wiper upon the automobile.

While I have described and shown certain preferred embodiments of my invention, many modifications may be made without departing from the spirit of the invention, and I do not wish to be limited to the precise details set forth but desire to avail myself of all changes within the scope of the appended claims.

Having thus described my invention, what I claim as new and desire to secure by Letters Patent of the United States is:

1. In a windshield cleaner, the combination of a pair of windshield wipers movable across the surface of the windshield to wipe spaces within the normal fields of vision of occupants of the vehicle, a resilient lost motion driving connection for said wipers, a source of power, a clutch for coupling said driving connection with said source of power, a control element for operating said clutch, and means, including a pivoted overthrow arm attached to the wiper side of said driving connection and actuated by said control element for effecting a driving connection between said source of power and said wipers which is independent of said resilient lost motion driving connection and operates to move said wipers beyond their normal range of movement to positions outside of the field of vision of the occupants of the vehicle.

2. In a windshield cleaner, the combination of a rotatable crank, a disengageable clutch for operatively connecting said crank to a source of power, a pair of oscillatory windshield wipers, a link for oscillating said wipers, a lost motion connection between said crank and said link, a projection on said crank, an arm pivoted to said link, resilient means to move said arm out of the path of movement of the projection on said crank, a manually operable control element for said clutch, and means operated by said element when it is moved from clutch engaging position to clutch disengaging position to move said arm into the path of movement of said projection on said crank, whereby when said control element is moved to clutch disengaging position said projection will engage said arm and move said link and said wipers beyond their normal operating positions.

JOHN B. WHITTED.